(12) United States Patent
Casella et al.

(10) Patent No.: US 10,484,354 B2
(45) Date of Patent: Nov. 19, 2019

(54) DATA OWNER RESTRICTED SECURE KEY DISTRIBUTION

(71) Applicant: TELEFONAKTIEBOLAGET LM ERICSSON (PUBL), Stockholm (SE)

(72) Inventors: Dario Casella, Kantvik (FI); Ilhan Gurel, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 298 days.

(21) Appl. No.: 15/433,938

(22) Filed: Feb. 15, 2017

(65) Prior Publication Data

US 2018/0234403 A1    Aug. 16, 2018

(51) Int. Cl.
*H04L 29/06* (2006.01)
*H04L 9/32* (2006.01)

(52) U.S. Cl.
CPC .......... *H04L 63/062* (2013.01); *H04L 9/3234* (2013.01); *H04L 63/0435* (2013.01); *H04L 63/061* (2013.01); *H04L 63/0807* (2013.01); *H04L 63/0853* (2013.01)

(58) Field of Classification Search
CPC . H04L 63/062; H04L 63/0435; H04L 63/061; H04L 63/0807; H04L 63/0853; H04L 9/3213; H04L 9/3234; H04L 2209/603
USPC ...................................................... 713/172
See application file for complete search history.

(56) References Cited

U.S. PATENT DOCUMENTS

| | | | | |
|---|---|---|---|---|
| 5,629,980 A * | 5/1997 | Stefik | .................. | G06F 21/10 705/54 |
| 6,920,567 B1 * | 7/2005 | Doherty | .................. | G06F 21/10 707/999.104 |
| 7,310,729 B2 * | 12/2007 | Gordon | .................. | G06F 21/10 713/161 |
| 7,353,541 B1 * | 4/2008 | Ishibashi | .................. | G06F 21/10 348/E7.056 |
| 8,438,234 B2 * | 5/2013 | Kunz | .................. | G06Q 10/107 455/412.1 |
| 9,635,010 B2 * | 4/2017 | Counterman | .................. | H04L 63/0876 |
| 9,769,654 B2 * | 9/2017 | Bettale | .................. | H04W 12/04 |
| 9,948,459 B2 * | 4/2018 | Ko | .................. | H04L 9/0838 |
| 10,063,377 B2 * | 8/2018 | Counterman | .................. | H04L 63/0876 |
| 2004/0001594 A1 * | 1/2004 | Krishnaswamy | ... | H04L 63/0428 380/277 |
| 2004/0054630 A1 * | 3/2004 | Ginter | .................. | G06F 21/10 705/53 |
| 2004/0078569 A1 * | 4/2004 | Hotti | .................. | G06F 21/6227 713/165 |
| 2004/0107109 A1 * | 6/2004 | Nakanishi | .................. | G06Q 30/06 705/52 |
| 2004/0128499 A1 * | 7/2004 | Peterka | .................. | H04L 63/062 713/155 |

(Continued)

*Primary Examiner* — Kambiz Zand
*Assistant Examiner* — Mahabub S Ahmed (57) ABSTRACT

A content distribution system is described herein which enables a data owner of content to set one or more restrictions on a data consumer where the one or more restrictions need to be satisfied by a data consumer device before the data consumer has access to the content. In addition, the content distribution system's components are described herein which include a data owner device, a key server, a data consumer device, a data producer device, and a content server.

19 Claims, 5 Drawing Sheets

(56) References Cited

U.S. PATENT DOCUMENTS

| | | | |
|---|---|---|---|
| 2005/0278787 A1* | 12/2005 | Naslund | G06F 21/10 726/26 |
| 2006/0026691 A1* | 2/2006 | Kim | G06F 21/10 726/27 |
| 2006/0173787 A1* | 8/2006 | Weber | G06F 21/105 705/59 |
| 2007/0033397 A1* | 2/2007 | Phillips, II | H04L 63/045 713/168 |
| 2007/0079381 A1* | 4/2007 | Hartung | G06F 21/10 726/26 |
| 2007/0100757 A1* | 5/2007 | Rhoads | G06F 21/10 705/51 |
| 2007/0124796 A1* | 5/2007 | Wittkotter | H04N 7/17309 725/136 |
| 2007/0255965 A1* | 11/2007 | McGucken | G06F 21/10 713/193 |
| 2007/0289022 A1* | 12/2007 | Wittkotter | H04L 63/123 726/27 |
| 2008/0162931 A1* | 7/2008 | Lord | H04L 9/08 713/165 |
| 2008/0235810 A1* | 9/2008 | Staring | G06F 21/10 726/29 |
| 2009/0132813 A1* | 5/2009 | Schibuk | G06Q 20/223 713/158 |
| 2009/0132825 A1* | 5/2009 | Mohanty | G06F 21/10 713/176 |
| 2009/0228450 A1* | 9/2009 | Zhang | G06F 21/10 |
| 2009/0313471 A1* | 12/2009 | Bjorkengren | G06F 21/10 713/170 |
| 2010/0094803 A1* | 4/2010 | Yamakawa | G06F 16/907 707/609 |
| 2010/0131411 A1* | 5/2010 | Jogand-Coulomb | G06F 21/10 705/54 |
| 2011/0007903 A1* | 1/2011 | Robert | G06F 21/10 380/279 |
| 2011/0040967 A1* | 2/2011 | Waller | G06F 21/10 713/161 |
| 2011/0047055 A1* | 2/2011 | Funk | G06Q 30/04 705/34 |
| 2011/0179268 A1* | 7/2011 | Strom | G06F 21/121 713/156 |
| 2011/0213971 A1* | 9/2011 | Gurel | G06F 21/10 713/165 |
| 2012/0008777 A1* | 1/2012 | Gurel | G06F 21/10 380/255 |
| 2012/0102317 A1* | 4/2012 | Mathur | G06F 21/10 713/156 |
| 2012/0173865 A1* | 7/2012 | Swaminathan | H04L 9/0637 713/150 |
| 2012/0179909 A1* | 7/2012 | Sagi | H04L 63/045 713/167 |
| 2012/0260345 A1* | 10/2012 | Quinn | G06F 21/57 726/26 |
| 2013/0073854 A1* | 3/2013 | Patti | H04L 9/0825 713/171 |
| 2013/0124859 A1* | 5/2013 | Pestoni | H04L 9/0825 713/163 |
| 2013/0125223 A1* | 5/2013 | Sorotokin | H04L 9/3213 726/6 |
| 2013/0254897 A1* | 9/2013 | Reedy | G06F 21/10 726/26 |
| 2014/0095890 A1* | 4/2014 | Mangalore | G06F 21/10 713/189 |
| 2014/0164124 A1* | 6/2014 | Rhoads | H04W 4/029 705/14.58 |
| 2014/0208409 A1* | 7/2014 | Maidl | G06F 21/10 726/9 |
| 2015/0156174 A1* | 6/2015 | Fahey | H04L 63/0428 713/168 |
| 2016/0028540 A1* | 1/2016 | Ko | H04L 9/0838 713/189 |
| 2016/0134602 A1* | 5/2016 | Poornachandran | H04L 63/0428 713/171 |
| 2016/0203299 A1* | 7/2016 | Auger | G06F 21/105 726/28 |
| 2017/0078362 A1* | 3/2017 | Schneider | H04L 67/02 |
| 2017/0171293 A1* | 6/2017 | Thomassen | H04L 67/06 |
| 2017/0286698 A1* | 10/2017 | Shetty | H04L 67/1097 |
| 2017/0329942 A1* | 11/2017 | Choi | H04L 9/088 |
| 2018/0041544 A1* | 2/2018 | Brookins | H04L 63/20 |
| 2018/0145953 A1* | 5/2018 | Swahn | G06F 21/606 |

\* cited by examiner

DATA OWNER RESTRICTED SECURE KEY DISTRIBUTION

TECHNICAL FIELD

The present disclosure relates to a content distribution system which enables a data owner of content to set one or more restrictions on a data consumer where the one or more restrictions need to be satisfied by a data consumer device before the data consumer has access to the content. In addition, the present disclosure relates to the content distribution system's components including a data owner device, a key server, a data consumer device, a data producer device, and a content server.

BACKGROUND

Certain content distribution technologies (e.g., Kerberos, Digital Rights Management (DRM)) utilize a secure key distribution as well as authentication tokens where the data consumers are authenticated based on cryptographic means (i.e., digital signature and certificates) before the data consumers receive encrypted keys which enable the decryption and use of the content. These content distribution technologies can also distribute content keys to data consumers with restrictions related to the use of the content after authenticating the data consumers. More specifically, the data distributor that distributes the content to the data consumers can impose restrictions on those data consumers in which the restrictions need to be satisfied before the data consumers can decrypt and use the content. Although these content distribution technologies work well in most of the cases they can still be improved upon. One such improvement to the content distribution technology is the subject of the present disclosure.

SUMMARY

A content distribution system, a data owner device, a key server, a data consumer device, and various methods for improving the content distribution technology are described in the independent claims. Advantageous embodiments of the content distribution system, the data owner device, the key server, the data consumer device, and the various methods are further described in the dependent claims.

In one aspect, the present disclosure provides a content distribution system comprising: a data owner device, a data producer device, a data consumer device, a content server, and a key server. The data producer device is configured to (1) use at least one key and at least one initialization vector (IV) to encrypt content, wherein the content is owned by a data owner, (2) upload encrypted data associated with the at least one key and the at least one IV to the key server, and (3) upload the encrypted content to the content server. The data owner device, operated by the data owner, is configured to issue an authentication token to the key server, wherein the authentication token includes one or more restrictions for a data consumer. The data consumer device, operated by the data consumer, is configured to download the encrypted content from the content server. The key server is configured to (1) receive a request from the data consumer device for access to key data specific to the content, (2) perform an authentication check with the data consumer device to ensure the one or more restrictions are satisfied, and (3) download the key data to the data consumer device once the one or more restrictions are satisfied. The data consumer device is further configured to use the key data to decrypt the encrypted content. An advantage of the content management system is that the data owner can impose restriction(s) on the data consumer that need to be satisfied before the data consumer can access the data owner's content.

In one aspect, the present disclosure provides a data owner device which is operated by a data owner and configured to restrict distribution of content to a data consumer. The data owner device comprises a processor and a memory that stores processor-executable instructions, wherein the processor interfaces with the memory to execute the processor-executable instructions, whereby the data owner device is operable to perform an issue operation. In the issue operation, the data owner device issues, to a key server, an authentication token which includes one or more restrictions that need to be satisfied before the content is able to be decrypted by a data consumer device, wherein the data consumer device is operated by the data consumer, wherein the content is owned by the data owner, and wherein the one or more restrictions are imposed by the data owner. An advantage of the data owner device performing the issue operation is that the data owner can impose restriction(s) on the data consumer that need to be satisfied before the data consumer can access the data owner's content.

In another aspect, the present disclosure provides a method in a data owner device which is operated by a data owner and configured to restrict distribution of content to a data consumer. The method comprises an issuing step. In the issuing step, the data owner device issues, to a key server, an authentication token which includes one or more restrictions that need to be satisfied before the content is able to be decrypted by a data consumer device, wherein the data consumer device is operated by the data consumer, wherein the content is owned by the data owner, and wherein the one or more restrictions are imposed by the data owner. An advantage of this method is that the data owner can impose restriction(s) on the data consumer that need to be satisfied before the data consumer can access the data owner's content.

In one aspect, the present disclosure provides a key server. The key server comprises a processor and a memory that stores processor-executable instructions, wherein the processor interfaces with the memory to execute the processor-executable instructions, whereby the key server is operable to perform a first receive operation, a second receive operation, a perform operation, and a download operation. In the first receive operation, the key server receives, from a data owner device operated by a data owner, an authentication token which includes one or more restrictions (imposed by the data owner) that need to be satisfied before content (owned by the data owner) is able to be decrypted by a data consumer device. In the second receive operation, the key server receives from the data consumer device operated by a data consumer a request for access to key data specific to the content. In the perform operation, the key server performs an authentication check with the data consumer device to ensure the one or more restrictions are satisfied. In the download operation, the key server downloads the key data to the data consumer device once the one or more restrictions are satisfied during the authentication check, wherein the key data enables decryption of the content by the data consumer device. An advantage of the key server performing these operations is that the data owner can impose restriction(s) on the data consumer that need to be satisfied before the data consumer can access the data owner's content.

In another aspect, the present disclosure provides a method in a key server. The method comprises a first receiving step, a second receiving step, a performing step, and a downloading step. In the first receiving step, the key server receives, from a data owner device operated by a data owner, an authentication token which includes one or more restrictions (imposed by the data owner) that need to be satisfied before content (owned by the data owner) is able to be decrypted by a data consumer device. In the second receiving step, the key server receives from the data consumer device operated by a data consumer a request for access to key data specific to the content. In the perform operation, the key server performs an authentication check with the data consumer device to ensure the one or more restrictions are satisfied. In the downloading step, the key server downloads the key data to the data consumer device once the one or more restrictions are satisfied during the authentication check, wherein the key data enables decryption of the content by the data consumer device. An advantage of this method is that the data owner can impose restriction(s) on the data consumer that need to be satisfied before the data consumer can access the data owner's content.

In yet another aspect, the present disclosure provides a data consumer device operated by a data consumer and configured to satisfy one or more restrictions imposed by a data owner before being allowed to decrypt encrypted content. The data consumer device comprises a processor and a memory that stores processor-executable instructions, wherein the processor interfaces with the memory to execute the processor-executable instructions, whereby the data consumer device is operable to perform a first download operation, a send operation, a perform operation, a second download operation, and a use operation. In the first download operation, the data consumer device downloads, from a content server, encrypted content, wherein the encrypted content is owned by a data owner. In the send operation, the data consumer device sends, to a key server, a request for access to key data specific to the content. In the perform operation, the data consumer device performs, with the key server, an authentication check to ensure the one or more restrictions are satisfied, wherein the one or more restrictions have been set by the data owner. In the second download operation, the data consumer device downloads, from the key server, the key data once the one or more restrictions are satisfied. In the use operation, the data consumer device uses the key data to decrypt the encrypted content. An advantage of the data consumer device performing these operations is that the data owner can impose restriction(s) on the data consumer that need to be satisfied before the data consumer can access the data owner's content.

In still yet another aspect, the present disclosure provides a method in a data consumer device operated by a data consumer and configured to satisfy one or more restrictions imposed by a data owner before being allowed to decrypt encrypted content. The method comprises a first downloading step, a sending step, a performing step, a second downloading step, and a using step. In the first downloading step, the data consumer device downloads, from a content server, encrypted content, wherein the encrypted content is owned by a data owner. In the sending step, the data consumer device sends, to a key server, a request for access to key data specific to the content. In the performing step, the data consumer device performs, with the key server, an authentication check to ensure the one or more restrictions are satisfied, wherein the one or more restrictions have been set by the data owner. In the second downloading step, the data consumer device downloads, from the key server, the key data once the one or more restrictions are satisfied. In the using step, the data consumer device uses the key data to decrypt the encrypted content. An advantage of this method is that the data owner can impose restriction(s) on the data consumer that need to be satisfied before the data consumer can access the data owner's content.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

The new content distribution system 100 described herein improves upon the existing content distribution technologies because it enables a data owner 102 of content 104 to impose one or more restrictions 106 which need to be satisfied by a data consumer device 108 before key materials 130 are distributed to the data consumer device 108 which enables a data consumer 112 to access the content 104. For example, the one or more restrictions 106 may include, but not be limited to: attestation requirement(s) (e.g. see FIG. 2), a geography location requirement, a purpose requirement, a validity period, and/or any other arbitrary requirement. The traditional content distribution technologies do not allow the data owner 102 to impose such restriction(s) 106 on the data consumer 112. Instead, the traditional content distribution technologies enable the data distributor (e.g., data producer device 114) or the company that distributes the content to the data consumer 112 to impose various restriction(s) on the data consumer 112. For example, in the case of protected video, it is the data producer device 114 not the movie maker or the movie actor (i.e., the data owner 102) that can impose restriction(s) on the data consumers 112. The new content distribution system 100 described herein enables the movie maker or the movie actor (i.e., the data owner 102) to impose restriction(s) 106 on the data consumers 114.

The new content distribution system 100 is a marked improved over the traditional content distribution technologies in several ways some of which are as follows:

Ability for the data owner 102 to dictate restriction(s) 106 for the distribution of key materials 130 to the data consumer device 108. Note: the data owner 102's restriction(s) 106 can be in addition to any restriction(s) that happen to be imposed by the data producer device 114 on the data consumer 112.

The restriction(s) 106 can optionally be based on attestation (for example if data consumer 114/data consumer device 112 fulfills certain trustworthiness criteria's, like a certain geography location, being able to process key material 130 in a trusted environment, etc. . . . ) (note: these types of restrictions are not the type of traditional restrictions that the data producer could impose on the data consumer).

As an example, the use of TEE (Trusted Execution Environment) in the data consumer device 108 can be one of the trustworthiness criteria's. "Trusted Execution Environment" is an environment whose data and code cannot be manipulated and accessed from outside of its trust boundaries. This "Trusted Execution Environment" also ensures that certain cryptographic operations and key materials 130 are handled within a trusted environment without leaking them.

Another example is "trusted geo location", which means fetching and handling geo location information in a trusted environment operated by the data consumer device 108.

Attesting the trustworthiness of the data consumer 112 before distributing key material 130 to the data consumer device 108.

Sending a notification 127 to the data owner device 116 in case of authentication failures upon the imposed restriction(s) 106 of the data consumer 112.

Figure 1:
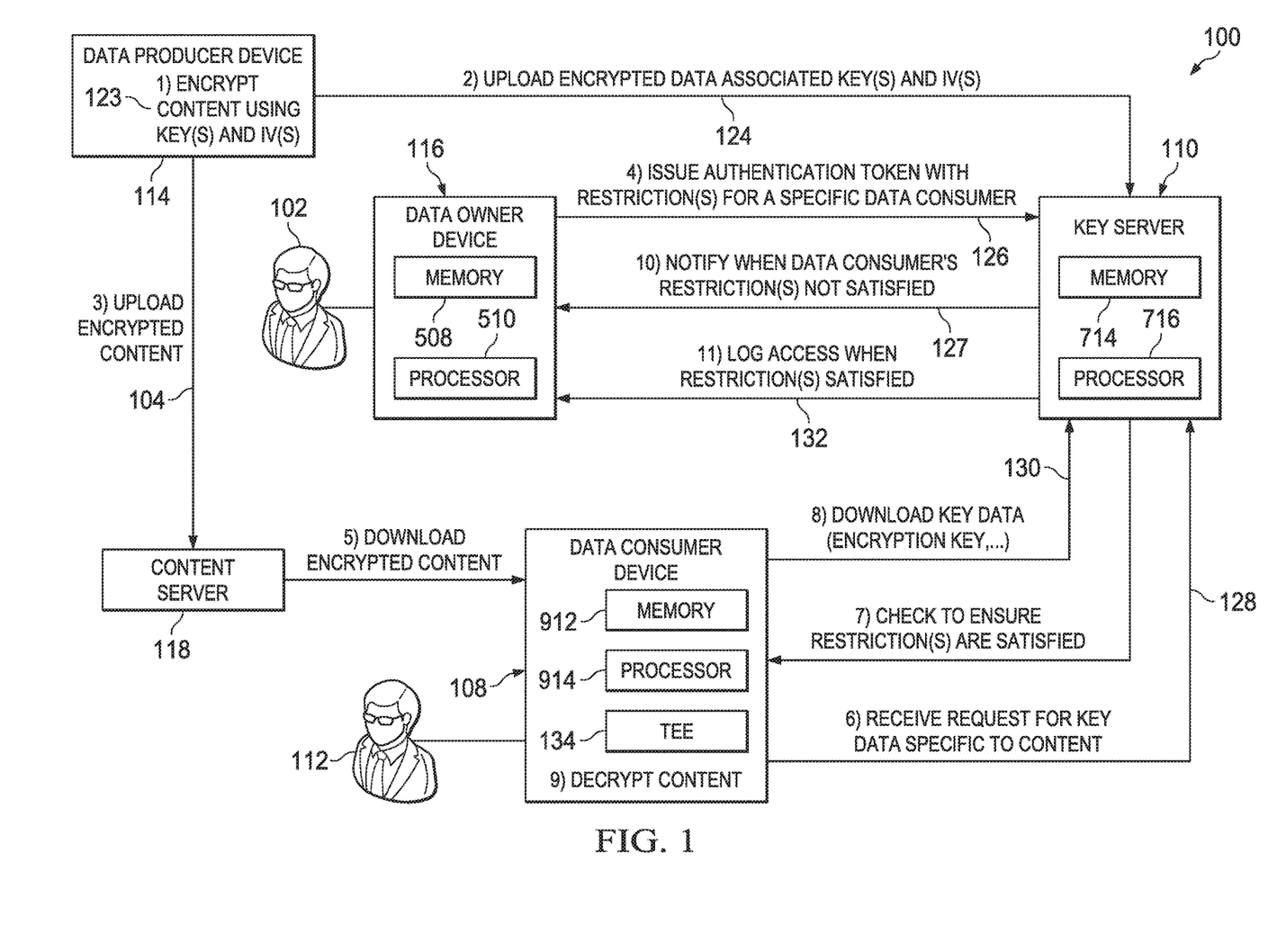
FIG. 1 is a diagram of a content distribution system which includes a data owner device (used by a data owner), a key server, a data consumer device (used by a data consumer), a data producer device, and a content server configured in accordance with an embodiment of the present disclosure.

Referring to FIG. 1, there is a diagram of the new content distribution system 100 which includes the data owner device 116 (used by the data owner 102), the key server 110, the data consumer device 108 (used by the data consumer 112), the data producer device 114, and the content server 118 configured in accordance with an embodiment of the present disclosure. The content distribution system 100 is configured to enable the data owner 102 of content 104 to impose one or more restrictions 106 which need to be satisfied by the data consumer device 108 before key materials 130 are distributed by the key server 110 to the data consumer device 108 which enables the data consumer 112 to access and utilize the content 104. An exemplary step-by-step discussion on how this can be accomplished is as follows:

1. The data producer device 114 is configured to use at least one key and at least one initialization vector (IV) 123 to encrypt the content 104 (note: the key(s) and IV(s) 123 used to encrypt the content 104 can be randomly selected and if desired the data owner 112 can select the algorithm/mode used to encrypt the content 104). The content 104 is owned by the data owner 112.

2. The data producer device 114 is further configured to upload encrypted data 124 associated with the key(s) and IV(s) 123 to the key server 110.

3. The data producer device 114 is further configured to upload the encrypted content 104 to the content server 118.

4. The data owner device 116 (operated by the data owner 102) is configured to issue an authentication token 126 to the key server 110. The authentication token 126 includes the restriction(s) 106 for the data consumer 112.

5. The data consumer device 108 (operated by the data consumer 112) is configured to download the encrypted content 104 from the content server 118.

6. The key server 110 is configured to receive a request 128 from the data consumer device 108 for access to key data 130 specific to the content 104.

7. The key server 110 is further configured to perform an authentication check with the data consumer device 108 to ensure that the restriction(s) 106 are satisfied. For example, the restriction(s) 106 can include an attestation requirement, a geography location requirement. a purpose requirement, a validity period etc. . . . . . In one example, the restriction(s) 106 may include an attestation requirement where the key server 110 has to remotely attest (confirm) a trustworthiness of an execution environment of the data consumer device 108. For instance, the key server 110 can remotely attest that the data consumer device 108 has an execution environment which is in a certain geography location. Alternatively, the key server 110 can remotely attest that the data consumer device 108 has a trusted execution environment (TEE) (see FIG. 2).

8. The key server 110 is configured to download key data 130 to the data consumer device 108 once the restriction(s) 106 are satisfied.

9. The data consumer device 108 is further configured to use the key data 130 to decrypt the encrypted content 104. At this point, the data consumer 112 has access to utilize the content 104. Note: steps 8 and 9 only occur if the key server 110 in step 7 confirmed that the restriction(s) 106 have been satisfied.

10. The key server 110 is configured to notify 127 the data owner device 116 when the restriction(s) 106 of the data consumer 112 are not satisfied during the authentication check in step 7. Note: step 10 only occurs if the key server 110 in step 7 confirmed that the restriction(s) 106 have not been satisfied.

11. The key server 110 is configured to provide a log access 132 to the data owner device 116. The log access 132 indicates which data consumer(s) 112 were given access to the key data 130 and when the access to the key data 130 was given to those data consumer(s) 112.

Note: If desired the various communications described above in steps 1-11 between the data owner device 116, the key server 110, the data consumer device 108, the data producer device 114, and the content server 118 can utilize transport layer security (TLS) as a secure communication protocol.

Figure 2:
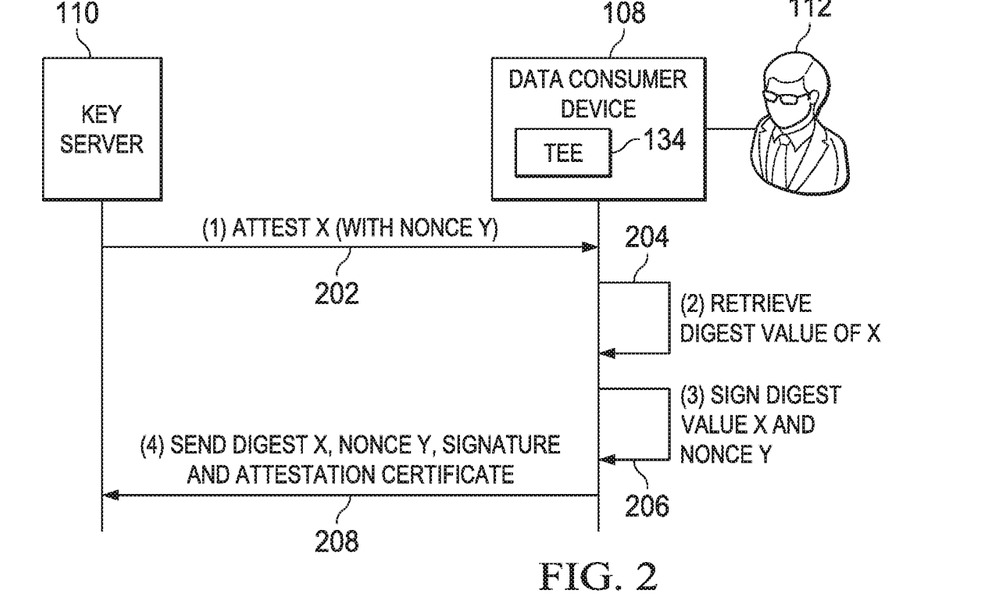
FIG. 2 is a diagram illustrating exemplary attestation signaling that can occur between the key server and the data consumer device to remotely attest a trusted execution environment (TEE) of the data consumer device before the data consumer device is given key data to access the data owner's content in accordance with an embodiment of the present disclosure.

Referring to FIG. 2, there is a diagram illustrating exemplary attestation signaling that can occur between the key server 110 and the data consumer device 108 to remotely attest a TEE 134 of the data consumer device 108 before the data consumer device 108 is given key data 130 to access the data owner's content 104 in accordance with an embodiment of the present disclosure (see FIG. 1's step 7). The step-by-step signaling is a follows:

1. The key server 110 sends an attest X (i.e., trustworthiness of data consumer device 108) to the TEE 134 of the data consumer device 108 TEE 134 (see FIG. 2's step 202). The attest X also has a random nonce value Y (to prevent replay attacks). The key server 110 knows the digest value of X. Note: the digest value of X is the outcome of a one way hash operation of X.

2. The data consumer device 108's TEE 134 concatenates value X and nonce Y to calculate a digest value as follows: DATA=DIGEST(DIGEST(X)+Y), where DATA is the outcome of one way hash operation of concatenated values of Y and digest of X (see FIG. 2's step 204).

3. The data consumer device 108's TEE 134 electronically signs the calculated digest value by using an attestation private key, which is only available within TEE 134 as follows: SIGNATURE=SIGN(DATA) (see FIG. 2's step 206).

4. The data consumer device 108's TEE 134 sends the signature, attestation certificate, digest value X and nonce Y back to the key server 110 (see FIG. 2's step 208). At this point, the data consumer device 108 has fulfilled the required restriction 106 (assuming this was the only restriction 106) so the key server 110 will deliver the key data 130 to the data consumer device 108 to enable the data consumer 112 to access and utilize the content 104 (see FIG. 1's steps 8 and 9).

Figure 3:
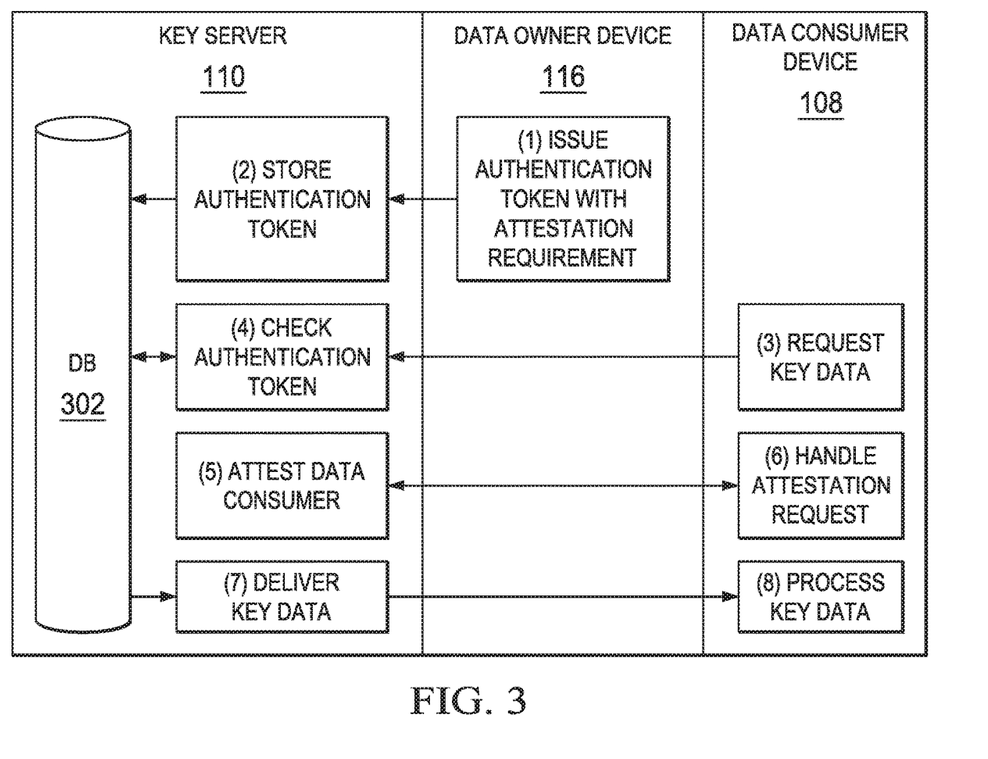
FIG. 3 is a diagram illustrating exemplary secure and trustworthy key distribution signaling that can occur between the key server, the data owner device, and the data consumer device in accordance with an embodiment of the present disclosure.

Referring to FIG. 3, there is a diagram illustrating exemplary secure and trustworthy key distribution signaling that can occur between the key server 110, the data owner device 116, and the data consumer device 108 in accordance with an embodiment of the present disclosure. The exemplary secure and trustworthy key distribution signaling has the following steps:

1. The data owner device 116 (operated by the data owner 102) is configured to issue an authentication token 126 to the key server 110. The authentication token 126 includes the restriction(s) 106 for the data consumer 112 (see FIG. 1's step 4).

2. The key server 110 stores the authentication token 126 in a database 302 (storage unit 302).

3. The data consumer device 108 sends a request 128 for access to key data 130 specific to the content 104 to the key server 110 (see FIG. 1's step 6).

4. The key server 110 interacts with the database 302 (storage unit 302) to check the authentication token 126 with respect to the received request 128.

5-6. The key server 110 is further configured to perform an authentication check (e.g., attest check) by interacting with the data consumer device 108 to ensure that the restriction(s) 106 are satisfied (see FIG. 1's step 7).

7. The key server 110 is configured to download key data 130 to the data consumer device 108 once the restriction(s) 106 are satisfied (see FIG. 1's step 8).

8. The data consumer device 108 is further configured to process the key data 130 to decrypt the encrypted content 104 (see FIG. 1's step 9).

The following is a summary of the aforementioned features and some additional features of the data owner device 116 (used by the data owner 102), the key server 110, the data consumer device 108 (used by the data consumer 112), the data producer device 114, and the content server 118.

Data Owner Device 116 (Used by the Data Owner 102):

The data owner 102 owns the content 104 and may own the data producer device 114.

Issues secure key distribution authentication tokens 126 (e.g., time, key id and consumer user id constrained) for data consumers 112 to retrieve a specific key 130 from the key server 110.

Uploads the secure key distribution authentication tokens 126 to the key server 110 (see FIG. 1's step 4).

Data Producer Device 114 (e.g., a Device which can Produce Data about the Data Owner 102):

Selectively encrypts content 104 (e.g., data 104) with unique key(s) and IV(s) 123 (see FIG. 1's step 1).

Uploads processed content 104 (e.g., encrypted data 104) to the content server 118 (see FIG. 1's step 3).

Uploads key data 124 associated with the key ids, IVs etc. ... to the key server 110 by encrypting them with a public key of the key server 110 (see FIG. 1's step 2). The key data 124 remains encrypted on the key server 110 at all times.

Data Consumer Device 118 (Used by the Data Consumer 112):

Fetches content 104 from the content server 110 (see FIG. 1's step 5).

Fetches key data 130 from the key server 110 assuming that a valid secure key distribution authentication token 126 is available (see FIG. 1's step 8).

Upon receiving the key data 130 from the key server 110, the data consumer device 118 decrypts the particular content 104 which was encrypted by the data producer device 114 based on data owner 102 imposed restriction(s) 106 (see FIG. 1's step 9).

Content Server 118

Logs requests from data consumer devices 118.

Receives (partly) encrypted content 104 from the data producer device 114 and stores the (partly) encrypted content 104 (see FIG. 1's step 3).

Deliver the (partly) encrypted content 104 to the data consumer device(s) 118 assuming that access policies (i.e., imposes restriction(s) 106) are (or will be) fulfilled before the content 104 can be decrypted by the data consumer device9s) 118 (see FIG. 1's step 5).

Key Server 110

Logs requests from data consumer devices 118.

Stores key data 124 submitted by the data producer device 114 (see FIG. 1's step 2).

Stores authentication token 126 submitted by data owner device 116.

Enforces authentication checks when receiving a request 128 from the data consumer device 118 (see FIG. 1's steps 6 and 7).

Decrypts key data, finds specific key id and provides associated key and IV data 130 to data consumer device 118 assuming that access has been granted (see FIG. 1's step 8).

Figure 4:
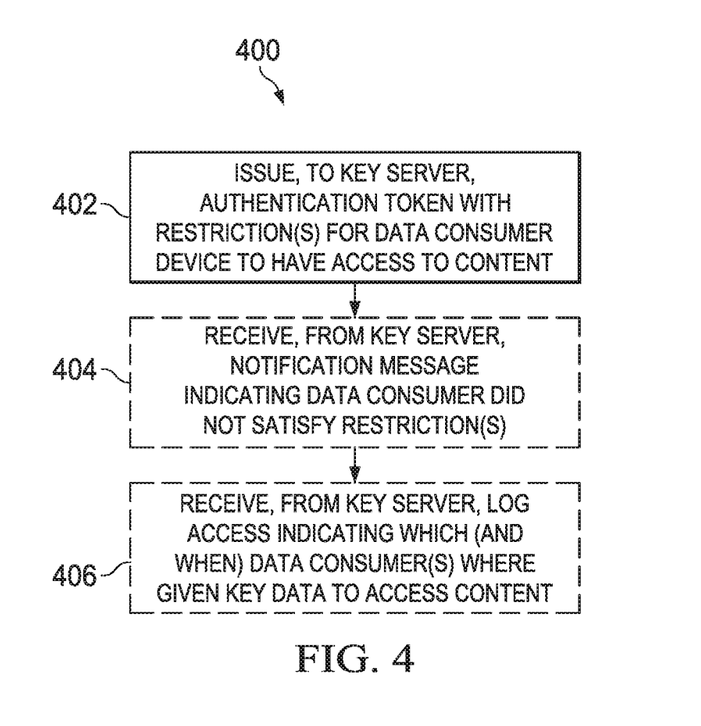
FIG. 4 is a flowchart of a method implemented in the data owner device in accordance with an embodiment of the present disclosure.

Referring to FIG. 4, there is a flowchart of a method 400 implemented in the data owner device 116 in accordance with an embodiment of the present disclosure At step 402, the data owner device 116 issues, to the key server 110, an authentication token 126 which includes one or more restrictions 106 (imposed by the data owner 102) that need to be satisfied before the content 104 (owned by the data owner 102) is able to be decrypted by a data consumer device 108 (see FIG. 1's step 4). For example, the restriction(s) 106 can include one or more of the following: an attestation requirement, a geography location requirement, a purpose requirement, and a validity period. At step 404, the data owner device 116 receives, from the key server 110, a notification message 127 indicating that the one or more restrictions 106 of the data consumer 112 were not satisfied during an authentication check between the key server 110 and the data consumer device 108 (see FIG. 1's step 10). At step 406, the data owner device 116 receives, from the key server 110, a log access 132 which indicates which data consumers 112 were given access to the key data 130 and when the access to the key data 130 was given to the data consumers 112 (see FIG. 1's step 11).

Figure 5:
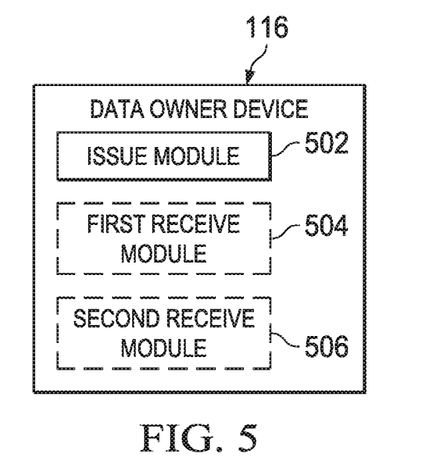
FIG. 5 is a block diagram illustrating a structure of the data owner device in accordance with an embodiment of the present disclosure.

Referring to FIG. 5, there is a block diagram illustrating structures of the data owner device 116 in accordance with an embodiment of the present disclosure. In one embodiment, the data owner device 116 comprises an issue module 502, a first receive module 504, and a second receive module 506. The issue module 502 is configured to issue, to the key server 110, an authentication token 126 which includes one or more restrictions 106 (imposed by the data owner 102) that need to be satisfied before the content 104 (owned by the data owner 102) is able to be decrypted by a data consumer device 108 (see FIG. 1's step 4). For example, the restriction(s) 106 can include one or more of the following: an attestation requirement, a geography location requirement, a purpose requirement, and a validity period. The first receive module 504 is configured to receive, from the key server 110, a notification message 127 indicating that the one or more restrictions 106 of the data consumer 112 were not satisfied during an authentication check between the key server 110 and the data consumer device 108 (see FIG. 1's step 10). The second receive module 506 is configured to receive, from the key server 110, a log access 132 which indicates which data consumers 112 were given access to the key data 130 and when the access to the key data 130 was given to the data consumers 112 (see FIG. 1's step 11). In addition, it should be noted that the data owner device 116 may also include other components, modules or structures which are well-known (e.g., display, operator interface, speakers, input interface, output interface), but for clarity, only the components, modules or structures needed to describe the features of the present disclosure are described herein.

As those skilled in the art will appreciate, the above-described modules 502, 504, and 506 of the data owner device 116 may be implemented separately as suitable dedicated circuits. Further, the modules 502, 504, and 506 can also be implemented using any number of dedicated circuits through functional combination or separation. In some embodiments, the modules 502, 504, and 506 may be even combined in a single application specific integrated circuit (ASIC). As an alternative software-based implementation, the data owner device 116 may comprise a memory 508, and a processor 510 (including but not limited to a microprocessor, a microcontroller or a Digital Signal Processor (DSP), etc.). The memory 508 stores machine-readable program code executable by the processor 510 to cause the data owner device 116 to perform the steps of the above-described method 400.

Figure 6:
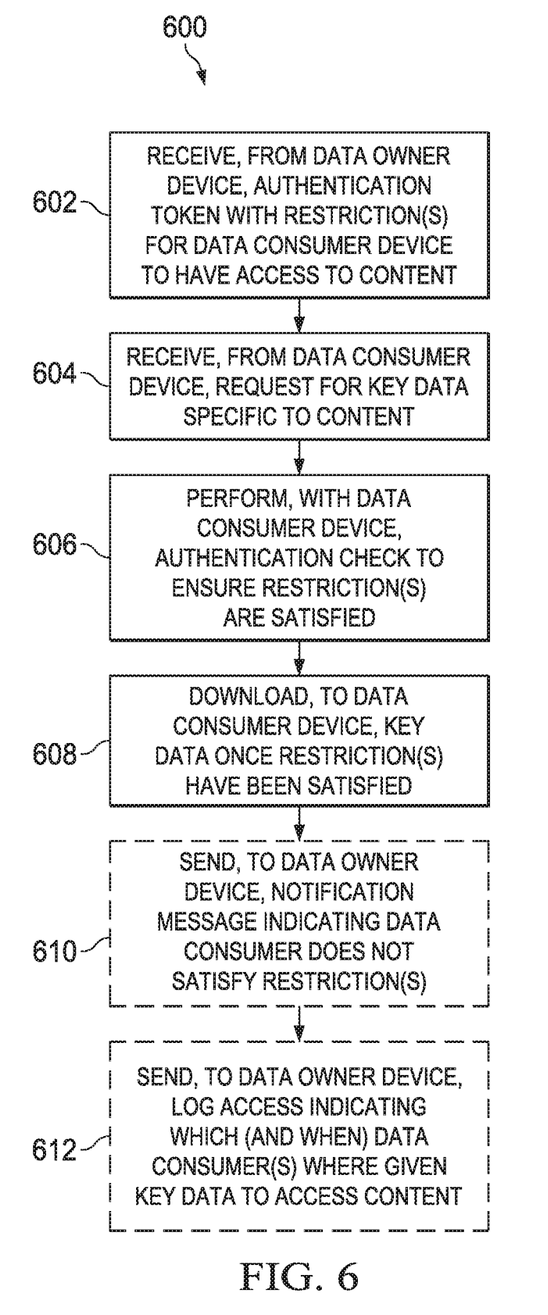
FIG. 6 is a flowchart of a method implemented in the key server in accordance with an embodiment of the present disclosure.

Referring to FIG. 6, there is a flowchart of a method 400 implemented in the key server 110 in accordance with an embodiment of the present disclosure At step 602, the key server 110 receives, from a data owner device 116, an authentication token 126 which includes one or more restrictions 106 (imposed by the data owner 102) that need to be satisfied before content 104 (owned by data owner 102) is able to be decrypted by a data consumer device 108 (see FIG. 1's step 4). For example, the restriction(s) 106 can include one or more of the following: an attestation requirement, a geography location requirement, a purpose requirement, and a validity period. At step 604, the key server 110 receives, from the data consumer device 108, a request 128 for access to key data 130 specific to the content 104 (see FIG. 1's step 6). At step 606, the key server 110 performs an authentication check with the data consumer device 108 to ensure the one or more restrictions 106 are satisfied (e.g., see FIG. 1's step 7 and FIG. 2). At step 608, the key server 110 downloads the key data 130 to the data consumer device 108 once the one or more restrictions 106 are satisfied during the authentication check (e.g., see FIG. 1's step 8). The key data 130 enables the data consumer device 108 to decrypt the encrypted content 104. At step 610, the key server 110 sends, to the data owner device 116, a notification message 127 when the one or more restrictions 106 of the data consumer 12 are not satisfied during the authentication check (see FIG. 1's step 10). At step 612, the key server 110 provide, to the data owner device 116, a log access 132 which indicates which data consumer(s) 112 were given access to the key data 130 and when the access to the key data 130 was given to the data consumer(s) 112 (see FIG. 1's step 11).

Figure 7:
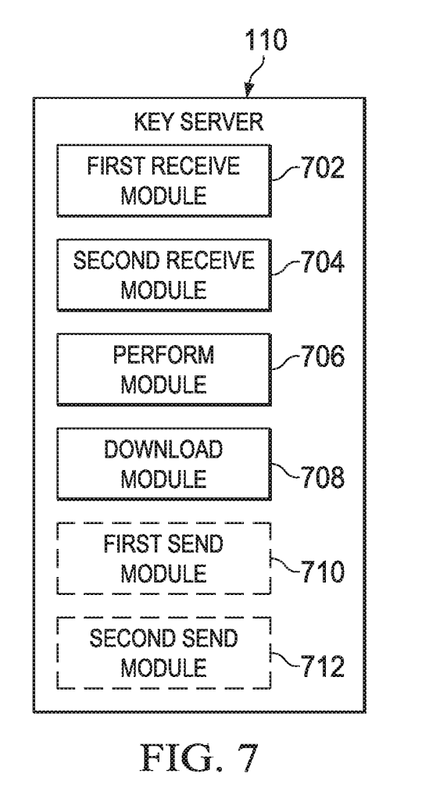
FIG. 7 is a block diagram illustrating a structure of the key server in accordance with an embodiment of the present disclosure.

Referring to FIG. 7, there is a block diagram illustrating structures of the key server 110 in accordance with an embodiment of the present disclosure. In one embodiment, the key server 110 comprises a first receive module 702, a second receive module 704, a perform module 706, a download module 708, a first send module 710, and a second send module 712. The first receive module 702 is configured to receive, from a data owner device 116, an authentication token 126 which includes one or more restrictions 106 (imposed by the data owner 102) that need to be satisfied before content 104 (owned by data owner 102) is able to be decrypted by a data consumer device 108 (see FIG. 1's step 4). For example, the restriction(s) 106 can include one or more of the following: an attestation requirement, a geography location requirement, a purpose requirement, and a validity period. The second receive module 704 is configured to receive, from the data consumer device 108, a request for access to key data 130 specific to the content 104 (see FIG. 1's step 6). The perform module 706 is configured to perform an authentication check with the data consumer device 108 to ensure the one or more restrictions 106 are satisfied (e.g., see FIG. 1's step 7 and FIG. 2). The download module 708 is configured to download the key data 130 to the data consumer device 108 once the one or more restrictions 106 are satisfied during the authentication check (e.g., see FIG. 1's step 8). The key data 130 enables the data consumer device 108 to decrypt the encrypted content 104. The first send module 710 is configured to send, to the data owner device 116, a notification message 127 when the one or more restrictions 106 of the data consumer 12 are not satisfied during the authentication check (see FIG. 1's step 10). The second send module 712 is configured to send, to the data owner device 116, a log access 132 which indicates which data consumer(s) 112 were given access to the key data 130 and when the access to the key data 130 was given to the data consumer(s) 112 (see FIG. 1's step 11). In addition, it should be noted that the key server 110 may also include other components, modules or structures which are well-known, but for clarity, only the components, modules or structures needed to describe the features of the present disclosure are described herein.

As those skilled in the art will appreciate, the above-described modules 702, 704, 706, 708, 710, and 712 of the key server 110 may be implemented separately as suitable dedicated circuits. Further, the modules 702, 704, 706, 708, 710, and 712 can also be implemented using any number of dedicated circuits through functional combination or separation. In some embodiments, the modules 702, 704, 706, 708, 710, and 712 may be even combined in a single application specific integrated circuit (ASIC). As an alternative software-based implementation, the key server 110 may comprise a memory 714, and a processor 716 (including but not limited to a microprocessor, a microcontroller or a Digital Signal Processor (DSP), etc.). The memory 714 stores machine-readable program code executable by the processor 716 to cause the key server 110 to perform the steps of the above-described method 600.

Figure 8:
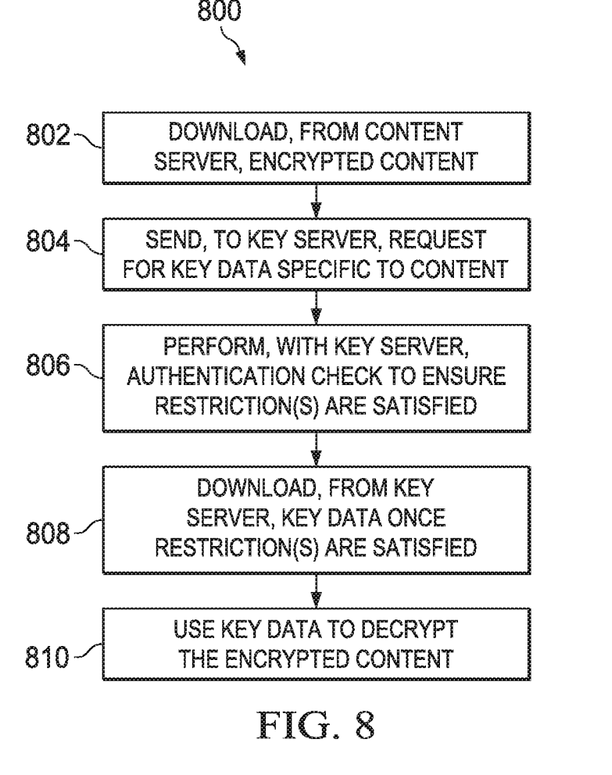
FIG. 8 is a flowchart of a method implemented in the data consumer device in accordance with an embodiment of the present disclosure; and, FIG. 9 is a block diagram illustrating a structure of the data consumer device in accordance with an embodiment of the present disclosure.

Referring to FIG. 8, there is a flowchart of a method 800 implemented in the data consumer device 108 in accordance with an embodiment of the present disclosure. At step 802, the data consumer device 108 downloads, from a content server 118, encrypted content 104 (owned by the data owner 102) (see FIG. 1's step 5). At step 804, the data consumer device 108 sends, to a key server 110, a request 128 for access to key data 130 specific to the content 104 (see FIG. 1's step 6). At step 806, the data consumer device 108 performs, with the key server 110, an authentication check to ensure one or more restrictions 106 imposed by the data owner 102 are satisfied before the data consumer device 108 is allowed to decrypt encrypted content 104 (see FIG. 1's step 7 and FIG. 2). For example, the restriction(s) 106 can include one or more of the following: an attestation requirement, a geography location requirement, a purpose requirement, and a validity period. At step 808, the data consumer device 108 downloads, from the key server 110, the key data 130 once the one or more restrictions 106 are satisfied (see FIG. 1's step 8). At step 810, the data consumer device 108 uses the key data 130 to decrypt the encrypted content 104 (see FIG. 1's step 9).

Figure 9:
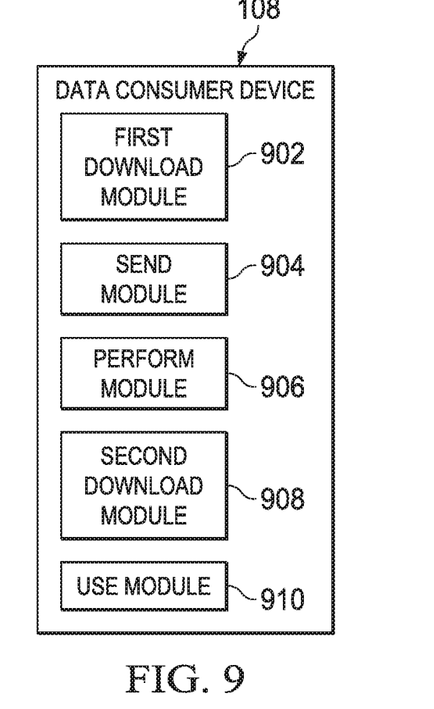

Referring to FIG. 9, there is a block diagram illustrating structures of the data consumer device 108 in accordance with an embodiment of the present disclosure. In one embodiment, the data consumer device 108 comprises a first download module 902, a send module 904, a perform module 906, a second download module 908, and a use module 910. The first download module 902 is configured to download, from a content server 118, encrypted content 104 (owned by the data owner 102) (see FIG. 1's step 5). The send module 904 is configured to send, to a key server 110, a request 128 for access to key data 130 specific to the content 104 (see FIG. 1's step 6). The perform module 906 is configured to perform, with the key server 110, an authentication check to ensure one or more restrictions 106 imposed by the data owner 102 are satisfied before the data consumer device 108 is allowed to decrypt encrypted content 104 (see FIG. 1's step 7 and FIG. 2). For example, the restriction(s) 106 can include one or more of the following: an attestation requirement, a geography location requirement, a purpose requirement, and a validity period. The second download module 908 is configured to download, from the key server 110, the key data 130 once the one or more restrictions 106 are satisfied (see FIG. 1's step 8). The use module 910 is configured to use the key data 130 to decrypt the encrypted content 104 (see FIG. 1's step 9). In addition, it should be noted that the data consumer device 108 may also include other components, modules or structures which are well-known (e.g., display, operator interface, speakers, input interface, output interface), but for clarity, only the components, modules or structures needed to describe the features of the present disclosure are described herein.

As those skilled in the art will appreciate, the above-described modules 902, 904, 906, 908, and 910 of the data consumer device 108 may be implemented separately as suitable dedicated circuits. Further, the modules 902, 904, 906, 908, and 910 can also be implemented using any number of dedicated circuits through functional combination or separation. In some embodiments, the modules 902, 904, 906, 908, and 910 may be even combined in a single application specific integrated circuit (ASIC). As an alternative software-based implementation, the data consumer device 108 may comprise a memory 912, and a processor 914 (including but not limited to a microprocessor, a microcontroller or a Digital Signal Processor (DSP), etc.). The memory 912 stores machine-readable program code executable by the processor 914 to cause the data consumer device 108 to perform the steps of the above-described method 800.

In view of the foregoing, one skilled in the art will appreciate that the content distribution system 100 enables the data owner 102 of content 104 to set one or more restrictions 106 on the data consumer 112 where the one or more restrictions 106 need to be satisfied by the data consumer device 108 before the data consumer 112 has access to the content 104. To accomplish this the data owner device 116 issues an authentication token 126 that indicates which data consumer 112 can have access to key material 130 after satisfying one or more imposed restriction(s) 106 such as date/time, geography location, attestation requirement, etc. . . . . . For example, the data owner 102 can configured the authentication token 126 to require that the trustworthiness of the data consumer device 108 be attested and the attestation needs to be verified before the key server 110 is permitted to provide key material 130 (enables decryption of content 104) to the data consumer device 108. The content distribution system 100 has many advantages some of which are as follows (for example):

- In regards to data privacy, the content distribution system 100 offers a significant advantage to allow the data owner 102 to be able to impose restrictions 106 upon who can access his/her personal data 104, when and from where.
- Another problem of the traditional content distribution technologies is the inability to attest remotely the trustworthiness of the data consumer device. So, as an example, in the past there was a risk that the access to the key data will be given to a data consumer device whose execution environment is not trusted. This has again a negative impact on data privacy as it may result in a privacy breach. The present disclosure (e.g., see FIG. 2) addresses this particular problem.
- Ensures that key data 130 can only be used in a trusted environment or in specific geography location or in certain conditions, according to the restriction(s) 106 imposed by the data owner 102.
- A trusted way of handling encryption keys 130 in a restricted way, putting network operators, Internet of Things (IoT) companies and individuals in control of their data 104. For example, a company can utilize the present disclosure and be a data owner 102 that can enforce restriction(s) 106 on the use of their data 104 based on company policies. The company 102 can also by imposing restriction(s) 106 determine who (ie., data consumers 112) can access data 104 (internal to company/external to company), where they can access the data 104, and when they can access the data 104.
- A secure access control to key data 130 for enhanced security and privacy protection, which fulfills the privacy expectations of the data owner 102.
- A secure mechanism to distribute selectively the key data 130 for trustworthy data consumption by data consumer(s) 112 based on: time, purpose, location or other criteria imposed by the data owner 102.

Full auditability and improved fraud prevention with enhanced secure logging where even some parts or all of the log entries can be encrypted.

The data owner device 116 described herein can be any type of device including (for example): mobile device (such as phone, tablet), PC (personal computer), etc. . . . .

The data consumer device 108 described herein can be any type of device including (for example): IoT (Internet of Things) device, mobile device (such as phone tablet), PC, cloud environment, etc. . . . .

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A content distribution system comprising:
a data owner device;
a data producer device;
a data consumer device;
a content server; and
a key server;
the data owner device, operated by the data owner, is configured to issue an authentication token to the key server, wherein the authentication token includes one or more restrictions for a data consumer;
the data consumer device, operated by the data consumer, is configured to download encrypted content from the content server, wherein the content server received the encrypted content from the data producer device and not the data owner device;
the key server is configured to (1) receive, from the data producer device, encrypted data associated with at least one key and at least one initialization vector (IV) used to encrypt the content, wherein the content is owned by the data owner, (2) receive a request from the data consumer device for access to key data specific to the content, (3) perform an authentication check with the data consumer device to ensure the one or more restrictions are satisfied, and (4) download the key data to the data consumer device once the one or more restrictions are satisfied;
the data consumer device is further configured to use the key data to decrypt the encrypted content: and
wherein the one or more restrictions include an attestation requirement where a trustworthiness of a trusted execution environment (TEE) of the data consumer device is remotely attested between the key server and the data consumer device as follows:
send, by the key server, an attest X with nonce Y message to the data consumer device, wherein the X is attestation that the data consumer device has the TEE and the Y is a random nonce value, wherein a digest value of X is known by the key server;
retrieve, by the data consumer device, a digest value of X by concatenating X and Y;
sign, by the data consumer device, the digest value of X by using a private key which is only available in the TEE; and
send, by the data consumer device, the digest value of X, the nonce Y, a signature of the data consumer device, and an attestation certificate to the key server.

2. The content distribution system of claim 1, wherein the one or more restrictions include an attestation requirement where the key server is configured to remotely attest a trustworthiness of an execution environment of the data consumer device.

3. The content distribution system of claim 2, where the execution environment is in a certain geography location.

4. The content distribution system of claim 2, wherein the execution environment is a trusted execution environment (TEE).

5. The content distribution system of claim 1, wherein the one or more restrictions include one or more of the following:
a geography location requirement;
a purpose requirement; and
a validity period.

6. The content distribution system of claim 1, wherein the key server is further configured to notify the data owner device when the one or more restrictions of the data consumer are not satisfied during the authentication check.

7. The content distribution system of claim 1, wherein the key server is further configured to provide a log access to the data owner device, wherein the log access indicates which data consumers were given access to the key data and when the access to the key data was given to the data consumers.

8. A key server comprising:
a processor; and
a memory that stores processor-executable instructions, wherein the processor interfaces with the memory to execute the processor-executable instructions, whereby the key server is operable to:

receive, from a data owner device operated by a data owner, an authentication token which includes one or more restrictions that need to be satisfied before content is able to be decrypted by a data consumer device, wherein the content is owned by the data owner, and wherein the one or more restrictions are imposed by the data owner;

receive, from the data consumer device operated by a data consumer, a request for access to key data specific to the content;

perform an authentication check with the data consumer device to ensure the one or more restrictions are satisfied;

download the key data to the data consumer device once the one or more restrictions are satisfied during the authentication check, wherein the key data enables decryption of the content by the data consumer device, and wherein the data owner device does not distribute the content to the data consumer device but rather a data producer device distributes the content via a content server to the data consumer device; and wherein the one or more restrictions include an attestation requirement in which the key server is operable to remotely attest a trustworthiness of a trusted execution environment (TEE) in the data consumer device as follows:

send, to the data consumer device, an attest X with nonce Y message, wherein the X is attestation that the data consumer device has the TEE and the Y is a random nonce value, wherein a digest value of X is known by the key server;

receive, from the data consumer device, the digest value of X, the nonce Y, a signature of the data consumer device, and an attestation certificate.

9. The key server of claim 8, wherein the key server is further operable to:
send, to the data owner device, a notification message when the one or more restrictions of the data consumer are not satisfied during the authentication check.

10. The key server of claim 8, wherein the key server is further operable to:
provide a log access to the data owner device, wherein the log access indicates which data consumers were given access to the key data and when the access to the key data was given to the data consumers.

11. The key server of claim 8, wherein the one or more restrictions include one or more of the following:
a geography location requirement;
a purpose requirement; and
a validity period.

12. A method in a key server, the method comprising:
receiving, from a data owner device operated by a data owner, an authentication token which includes one or more restrictions that need to be satisfied before content is able to be decrypted by a data consumer device, wherein the content is owned by the data owner and wherein the one or more restrictions are imposed by the data owner;

receiving, from the data consumer device operated by a data consumer, a request for access to key data specific to the content;

performing an authentication check with the data consumer device to ensure the one or more restrictions are satisfied;

downloading the key data to the data consumer device once the one or more restrictions are satisfied during the authentication check, wherein the key data enables decryption of the content by the data consumer device, and wherein the data owner device does not distribute the content to the data consumer device but rather a data producer device distributes the content via a content server to the data consumer device; and wherein the one or more restrictions include an attestation requirement in which the key server is operable to remotely attest a trustworthiness of a trusted execution environment (TEE) in the data consumer device as follows:

sending, to the data consumer device, an attest X with nonce Y message, wherein the X is attestation that the data consumer device has the TEE and the Y is a random nonce value, wherein a digest value of X is known by the key server;

receiving, from the data consumer device, the digest value of X, the nonce Y, a signature of the data consumer device, and an attestation certificate.

13. The method of claim 12, further comprising:
sending, to the data owner device, a notification message when the one or more restrictions of the data consumer are not satisfied during the authentication check.

14. The method of claim 12, further comprising:
providing a log access to the data owner device, wherein the log access indicates which data consumers were given access to the key data and when the access to the key data was given to the data consumers.

15. The method of claim 12, wherein the one or more restrictions include one or more of the following:
a geography location requirement;
a purpose requirement; and
a validity period.

16. A data consumer device operated by a data consumer and configured to satisfy one or more restrictions imposed by a data owner before being allowed to decrypt encrypted content, the data consumer device comprising:
a processor; and
a memory that stores processor-executable instructions, wherein the processor interfaces with the memory to execute the processor-executable instructions, whereby the data consumer device is operable to:
download, from a content server, encrypted content, wherein the encrypted content is owned by a data owner that operates a data owner device, and wherein the content server received the encrypted content from a data producer device and not the data owner device;
send, to a key server, a request for access to key data specific to the content;
perform, with the key server, an authentication check to ensure the one or more restrictions are satisfied, wherein the one or more restrictions have been set by the data owner;
download, from the key server, the key data once the one or more restrictions are satisfied;
use the key data to decrypt the encrypted content; and
wherein the one or more restrictions include an attestation requirement where the data consumer device is operable to remotely attest a trustworthiness of a trusted execution environment (TEE) in the data consumer device as follows:
receive, from the key server, an attest X with nonce Y message, wherein the X is attestation that the data consumer device has the TEE and the Y is a random nonce value;
retrieve a digest value of X by concatenating X and Y;
sign the digest value of X by using a private key which is only available in the TEE; and send, to the key server, the digest value of X, the nonce Y, a signature of the data consumer device, and an attestation certificate.

17. The data consumer device of claim 16, wherein the one or more restrictions include one or more of the following:
   a geography location requirement;
   a purpose requirement; and
   a validity period.

18. A method in a data consumer device operated by a data consumer and configured to satisfy one or more restrictions imposed by a data owner before being allowed to decrypt encrypted content, the method comprising:
   downloading, from a content server, encrypted content, wherein the encrypted content is owned by a data owner that operates a data owner device, and wherein the content server received the encrypted content from a data producer device and not the data owner device;
   sending, to a key server, a request for access to key data specific to the content;
   performing, with the key server, an authentication check to ensure the one or more restrictions are satisfied, wherein the one or more restrictions have been set by the data owner;
   downloading, from the key server, the key data once the one or more restrictions are satisfied;
   using the key data to decrypt the encrypted content; and
   wherein the one or more restrictions include an attestation requirement where the data consumer device is operable to remotely attest a trustworthiness of a trusted execution environment (TEE) in the data consumer device as follows:
   receiving, from the key server, an attest X with nonce Y message, wherein the X is attestation that the data consumer device has the TEE and the Y is a random nonce value;
   retrieving a digest value of X by concatenating X and Y;
   signing the digest value of X by using a private key which is only available in the TEE; and
   sending, to the key server, the digest value of X, the nonce Y, a signature of the data consumer device, and an attestation certificate.

19. The method of claim 18, wherein the one or more restrictions include one or more of the following:
   a geography location requirement;
   a purpose requirement; and
   a validity period.

* * * * *